(12) United States Patent
Khorashadi et al.

(10) Patent No.: US 8,874,131 B2
(45) Date of Patent: Oct. 28, 2014

(54) PROVIDING LOCATION RELATED INFORMATION FOR A STRUCTURE TO MOBILE STATIONS

(75) Inventors: Behrooz Khorashadi, San Diego, CA (US); Saumitra M. Das, San Diego, CA (US); Alok Aggarwal, Foster City, CA (US)

(73) Assignee: Qualcomm Incorporated, San Diego, CA (US)

( * ) Notice: Subject to any disclaimer, the term of this patent is extended or adjusted under 35 U.S.C. 154(b) by 223 days.

(21) Appl. No.: 13/215,737

(22) Filed: Aug. 23, 2011

(65) Prior Publication Data

US 2013/0053066 A1 Feb. 28, 2013

(51) Int. Cl.
*H04W 4/02* (2009.01)
*H04W 4/20* (2009.01)

(52) U.S. Cl.
CPC .. *H04W 4/20* (2013.01); *H04W 4/02* (2013.01)
USPC .................. 455/456.1; 455/456.2; 455/456.3; 455/456.4; 455/456.6; 455/457

(58) Field of Classification Search
USPC ............................................. 455/457, 456.1
See application file for complete search history.

(56) References Cited

U.S. PATENT DOCUMENTS

| 8,606,330 | B2 * | 12/2013 | Song et al. ..................... 455/566 |
| 2005/0020277 | A1 | 1/2005 | Krumm et al. |
| 2005/0250440 | A1 * | 11/2005 | Zhou et al. .................... 455/12.1 |
| 2008/0176583 | A1 * | 7/2008 | Brachet et al. ............. 455/456.3 |
| 2009/0189810 | A1 | 7/2009 | Murray |
| 2010/0127887 | A1 * | 5/2010 | Ledlie et al. ............. 340/825.49 |
| 2010/0157848 | A1 | 6/2010 | Das et al. |
| 2014/0141814 | A1 * | 5/2014 | Johnson ...................... 455/456.3 |

FOREIGN PATENT DOCUMENTS

WO 2009096839 A1 8/2009

OTHER PUBLICATIONS

International Search Report and Written Opinion—PCT/US2012/051311—ISA/EPO—Nov. 23, 2012.
Ledlie J., "Mole: a Scalable, User-Generated WiFi Positioning Engine", Sep. 23, 2011, pp. 1-10, XP055044312, Retrieved from the Internet URL: http://people.csail.mit.edu/ledlie/papers/ Mole-IPIN11.pdf [retrieved on Nov. 15, 2012].
Teller S., et al., "Organic Indoor Location Discovery", Internet Citation, Dec. 30, 2008, pp. 1-14, XP003028111, Retrieved from the Internet URL: http://dspace.mit.edu/bitstream/handle/1721.1/43951/MIT-CSAI L-TR-2008-075.pdf [retrieved on Jan. 1, 2011].
King, et al., "On-Demand Fingerprint Selection for 802.11-based Positioning Systems," {king,haenselmann,effelsberg}@informatik.uni-mannheim.de, Department of Computer Science University of Mannheim, Germany, 8 pages.

* cited by examiner

*Primary Examiner* — Huy C Ho
*Assistant Examiner* — Dung Lam
(74) *Attorney, Agent, or Firm* — Berkeley Law & Technology Group, LLP (57) ABSTRACT

Techniques are provided which may be implemented using various methods and/or apparatuses to allow for location related information for a region of space within a structure to be divided into blocks and selectively provided in an efficient manner to a mobile station and/or a proxy device associated therewith. The mobile station may, for example, use the blocks of location related information to support signal-based position estimation and/or other like location based services.

53 Claims, 7 Drawing Sheets

PROVIDING LOCATION RELATED INFORMATION FOR A STRUCTURE TO MOBILE STATIONS

BACKGROUND

1. Field

The subject matter disclosed herein relates to electronic devices, and more particularly to methods and apparatuses for use in providing location related information to a mobile station.

2. Information

GPS and other like satellite positioning systems have enabled navigation services for mobile handsets in outdoor environments. Since satellite signals may not be always be reliably received and/or acquired in an indoor environment, different techniques may be employed to enable position estimation and related navigation services. For example, mobile stations can typically obtain a position fix by measuring ranges to three or more terrestrial radio transmitters which are positioned at known locations. Such ranges may be measured, for example, by obtaining a MAC ID address from signals received from such access points and measuring one or more characteristics of signals received from such access points such as, for example, signal strength, round trip delay, just to name a few examples.

By way of additional example, a mobile station, such as, a mobile phone, smart phone, etc., may perform signal-based position estimation to identify its location within a structure by considering different types of location related information. For example, expected signal data (e.g., heat map or radio map information) may be considered along with signal strength measurements, such as, received signal strength indicator (RSSI) values for signals received from various radio transmitters (e.g., access points, beacons, etc.). In other examples, expected signal data (e.g., delay map information) may be considered along with signal propagation time measurements, such as, round-trip time (RTT) values for signals exchanged with various radio transmitters. In still other instances, other types of location related information may be considered, such as, connectivity graph information, routing graph information, probability map information, and/or the like, which may relate to position points distributed in relationship to a map or graph of an indoor space. Thus, for example, a mobile station may use all or part of such location related information to estimate a relative position within the indoor space and/or to otherwise navigate therein.

Such location related information may be provided to a mobile station by one or more computing devices (e.g., servers, etc.), e.g., over wireless communication links. Such location related information may be provided for each radio transmitter and each position point within an indoor space. Accordingly, location related information may at times represent a significantly large amount of data. Transmitting such a large amount of data over a wireless network to a mobile station may prove costly in terms of power, bandwidth, and latency. Additionally, such location related information may also consume a significant amount of memory at a mobile station. Further still, a user experience with position estimation and other like location based service capabilities provided by a mobile station may be significantly affected should significant communication and/or processing delays arise, e.g., specifically with respect to a time to first fix (TTFF).

SUMMARY

In one example implementation, a method may be implemented with at least one computing device to obtain one or more signals representing location related information (LRI) associated with at least one region of space within a structure, wherein the at least one region of space is associated with a plurality of position points; divide the LRI into at least two blocks based, at least in part, on two or more LRI types, wherein each of the blocks is associated with each of the plurality of position points; and in response to a determination that the remote device lacks at least one of the at least two blocks available from the at least one computing device, transmitting the at least one of the at least two blocks to the remote device.

In another example implementation, an apparatus may comprise a network interface and one or more processing units. The one or more processing units may: obtain LRI associated with at least one region of space within a structure, wherein the at least one region of space is associated with a plurality of position points; divide the LRI into at least two blocks based, at least in part, on two or more LRI types, wherein each of the blocks is associated with each of the plurality of position points; and in response to a determination that the remote device lacks at least one of the at least two blocks available from the apparatus, initiate transmission of the at least one of the at least two blocks to the remote device via the network interface.

In yet another example implementation, an apparatus may comprise: means for obtaining LRI associated with at least one region of space within a structure, wherein the at least one region of space is associated with a plurality of position points; means for dividing the LRI into at least two blocks based, at least in part, on two or more LRI types, wherein each of the blocks is associated with each of the plurality of position points; and means for transmitting at least one of the at least two blocks to the remote device, in response to a determination that the remote device lacks the at least one of the at least two blocks available from the apparatus.

In another example implementation, an apparatus may comprise a network interface and one or more processing units. The one or more processing units may: obtain LRI associated with at least one region of space within a structure, wherein the at least one region of space is associated with a plurality of position points; divide the LRI into at least two blocks based, at least in part, on two or more LRI types, wherein each of the blocks is associated with each of the plurality of position points; and in response to a determination that the remote device lacks at least one of the at least two blocks available from the apparatus, initiate transmission of the at least one of the at least two blocks to the remote device via the network interface.

In still another example implementation, an article of manufacture may comprise a non-transitory computer readable medium having stored therein computer-implementable instructions executable by one or more processing units in at least one computing device to: obtain LRI associated with at least one region of space within a structure, wherein the at least one region of space is associated with a plurality of position points; divide the LRI into at least two blocks based, at least in part, on two or more LRI types, wherein each of the blocks is associated with each of the plurality of position points; and in response to a determination that the remote device lacks at least one of the at least two blocks available from the at least one computing device, initiate transmission of the at least one of the at least two blocks to the remote device.

In one example implementation a method may be implemented with a first device to: transmit a request for LRI associated with at least one region of space within a structure to at least one computing device, wherein the LRI is divided into at least two blocks based, at least in part, on two or more LRI types, and each of the blocks is associated with each of a plurality of position points within the at least one region of space, and the request comprises an indication of one or more existing blocks at the first device; obtain a response from the at least one computing device, the response comprising at least one of the at least two blocks available from the at least one computing device; and store the received at least one of the at least two blocks in an LRI cache.

In another example implementation, an apparatus may comprise memory, a network interface, and one or more processing units. The one or more processing units may: initiate transmission of a request for LRI associated with at least one region of space within a structure to at least one computing device via the network interface, wherein the LRI is divided into at least two blocks based, at least in part, on two or more LRI types, each of the blocks is associated with each of a plurality of position points within the at least one region of space, and the request comprises an indication of one or more existing blocks at the apparatus; obtain a response from the at least one computing device via the network interface, the response comprising at least one of the at least two blocks available from the at least one computing device; and initiate storage of the received at least one of the at least two blocks in an LRI cache in the memory.

In yet another example implementation an apparatus may comprise: means for transmitting a request for LRI associated with at least one region of space within a structure to at least one computing device, wherein the LRI is divided into at least two blocks based, at least in part, on two or more LRI types, each of the blocks is associated with each of a plurality of position points within the at least one region of space, and the request comprises an indication of one or more existing blocks at the apparatus; means for obtaining a response from the at least one computing device, the response comprising at least one of the at least two blocks available from the at least one computing device; and means for storing the received at least one of the at least two blocks in an LRI cache.

In still another example implementation, an article of manufacture may comprise a non-transitory computer readable medium having stored therein computer-implementable instructions executable by one or more processing units in a first device to: initiate transmission of a request for LRI associated with at least one region of space within a structure to at least one computing device, wherein the LRI is divided into at least two blocks based, at least in part, on two or more LRI types, each of the blocks is associated with each of a plurality of position points within the at least one region of space, and the request comprises an indication of one or more existing blocks at the first device; obtain a response from the at least one computing device, the response comprising at least one of the at least two blocks available from the at least one computing device; and store the received at least one of the at least two blocks in an LRI cache.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects, example techniques are provided which may be implemented using various methods and/or apparatuses to selectively provide location related information (LRI) in blocks to mobile stations and/or proxy devices associated therewith. Such techniques may also be implemented in such a mobile station and/or proxy device to selectively request, receive and store/maintain LRI in blocks.

As illustrated, in the examples herein, such blocks of LRI may be selectively established and/or provided in a manner which may reduce certain communication and/or processing delays that might otherwise significantly degrade a user experience and/or efficiency of position estimation and/or other like location based service capabilities.

By way of an initial example implementation, one or more computing devices may obtain LRI associated with at least one region of space within a structure. Here, for example, the LRI may comprise positioning related metadata and/or the like which is associated with at least one radio transmitter and/or otherwise related to each of a plurality of position points within the region of space. The computing device(s) may divide the LRI into at least two blocks based, at least in part, on two or more LRI types. Several non-limiting example LRI types are described herein, however, claimed subject matter is not necessarily limited to such examples.

In certain example implementations, for each radio transmitter which may be of use in position estimation, a block of LRI may be associated with each of the plurality of position points within the applicable region of space. In certain instances, such as, for example, small structures, such region of space may be contiguous and/or otherwise be bounded by the structure itself. Thus, two or more blocks of LRI may be provided for certain structures (e.g., having a single region of space). In certain other instances, a map or other like graph of a structure may be divided into two or more tile portions, and specific blocks of LRI may be associated with each tile portion (e.g., each region of space within the structure).

In certain example implementations, certain blocks of LRI may be established by such computing device(s) in advance (e.g., via offline processing) and stored until needed. Indeed, certain types of LRI and therefore blocks of LRI may be relatively static over time in comparison to other types of LRI. For example, as radio transmitters are added, removed, modified, etc., corresponding expected signal data may change more frequently than other types of LRI such as, routing graphs, connectively graphs, and/or probability maps which may be related to a layout of positioning points, structure features, user movements, etc. Consequently, in certain example implementations, some blocks of LRI may be pre-established while other blocks of LRI may be dynamically established and/or otherwise established more often or upon request. At certain times, for example, when processing demands are high, some or all of the blocks of LRI may be pre-established (stored) versions.

In certain example implementations, one or more blocks of LRI may be specifically established for use by a specific mobile station or class of mobiles stations, and/or a particular user account associated with the remote device or a particular class of user accounts. For example, certain mobile stations may have more or less processing and/or storage capability than others, and or certain user accounts may have specific preferences, etc.

Having established one or more blocks of LRI, a computing device(s) may selectively provide (e.g., transmit) individual blocks and/or groups of blocks to remote device (e.g., a mobile station and/or proxy device). Here, for example, a determination may be made as to whether a remote device lacks one or more blocks which are available from the computing device(s), e.g., the blocks are absent, or possibly out of date, etc.

Thus, in one example, a remote device may transmit an LRI request (e.g., in the form of one or more messages) to the computing device(s). Such LRI request may, for example, specify an initial estimated position and/or in some other manner identify a structure or region of space therein for which LRI is desired to support position estimation and/or other like location based service capabilities.

In certain example implementations, an LRI request may comprise an indication of one or more existing blocks at the remote device. Here, for example, such an indication may take the form of a unique block identifier (e.g., an assigned ID, a hash value, etc.). In certain instances, a lack of one or more expected unique block identifiers in an LRI request may indicate to the computing device(s) that a remote device lacks certain blocks of LRI. In certain other instances, one or more expected unique block identifiers may be present but deemed incorrect (e.g., out of date block, etc.), which may indicate to the computing device(s) that a remote device lacks certain blocks of LRI. The computing device(s) may then determine which, if any, blocks of LRI may be available for the remote device. For example, a comparison may be made of received (or missing) unique block identifier(s) to unique block identifier(s) for blocks available from the computing device(s). Hence, in a response (e.g., one or more messages) to such an LRI request, the computing device may selectively transmit one or more blocks of LRI to the remote device. In certain instances, certain blocks of LRI may be transmitted before other blocks of LRI, e.g., based on LRI type, priority, size, estimated location and/or likely travel route, etc.

In certain other example implementations, an initial LRI request may not comprise an indication of one or more existing blocks at the remote device. Instead, such an LRI request may be intended to invoke a response from the computing devices which indicates in some manner one or more blocks of LRI that are available from the computing device(s) for the remote device. Hence, a remote device may then determine whether one or more blocks of LRI available from the computing device are desired at the remote device. For example, a comparison may be made of received unique block identifier(s) to unique block identifiers for existing blocks at the remote device. A subsequent LRI request may then specify that one or more blocks be provided in a response from the computing device(s).

Also, as described in greater detail herein, in certain example implementations, a remote device may maintain an LRI cache for storing blocks of LRI. In one example implementation, a remote device (e.g., mobile station and/or proxy device) may perform a block update via replacement, e.g., by selectively replacing a corresponding existing block of LRI with a received block of LRI.

In another example implementation, a remote device may perform an eviction by selectively removing (e.g., erasing) one or more existing blocks from an LRI cache and/or replacing (e.g., overwriting) one or more non-corresponding existing blocks in the LRI cache with one or more received blocks. By way of non-limiting example, an eviction decision may be based, at least in part, on an "age" and/or a frequency of use of an existing block. For example, a block may be evicted based on an age (e.g., k number of months, etc.) related threshold, and/or a frequency of use (e.g., monitored use over a period of time) related threshold.

In another example, an eviction decision may be based, at least in part, on a size of an existing block. Here, for example, the size of a block in the LRI cache may be compared to an applicable threshold and/or to a size of one or more other blocks. Hence, it may be useful to select either larger/largest blocks or conversely smaller/smallest blocks for eviction at times.

In yet another example, an eviction decision may be based, at least in part, on a region of space associated with a particular stored block of LRI. Here, for example, certain regions of space (and hence blocks) may be deemed more important than others. Thus, for example, a region of space (e.g., associated with a specific tiled portion of a map and/or location context identifier (LCI)) may relate to one or more transition features (e.g., entryways, exits, elevators, staircases, ground level floors, lobbies, etc.). Thus, it may be useful to maintain blocks of LRI which are associated with regions of space that relate to one or more transition features and/or the like. Consequently, in certain implementations, one or more blocks of LRI data not associated with regions of space that relate to one or more transition features may be selected for eviction.

In certain example implementations, an LCI may be associated with several LRIs and as such one may decide to evict an entire LCI and its corresponding LRIs. In certain instances, two or more LCIs may be related in some manner (e.g., part of the same building) and as such certain selected LCIs (e.g., with connectivity to the external world) and its associated LRIs may be kept longer than any other LCIs/LRIs.

Figure 1:
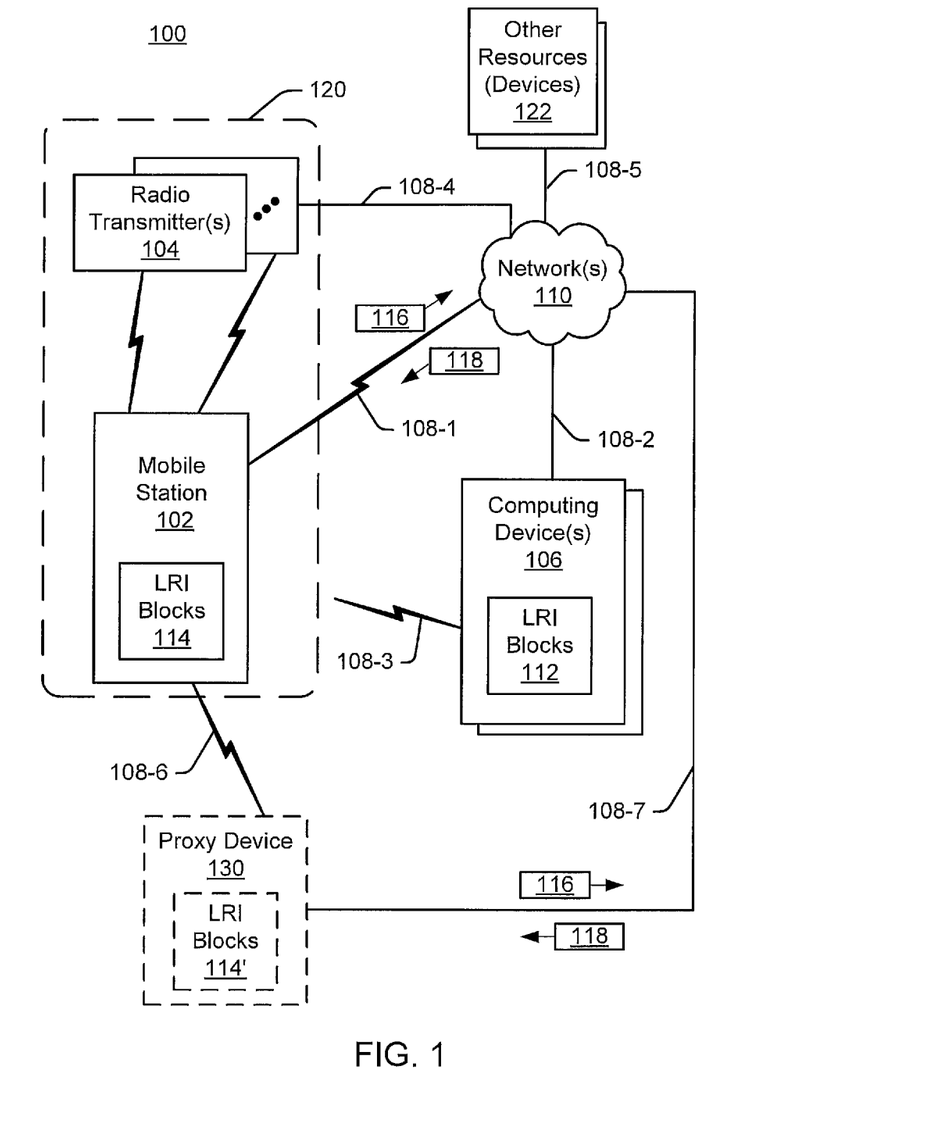
FIG. 1 is a schematic block diagram illustrating an example environment that includes one or more computing devices capable of selectively providing location related information (LRI) in blocks to a mobile station and/or a proxy device associated with a mobile station, in accordance with an implementation.

Attention is drawn now to FIG. 1 which is a schematic block diagram illustrating an example environment 100 that includes one or more computing devices 106 capable of providing one or more blocks of LRI to a mobile station 102 and/or proxy device 130, in accordance with an implementation.

Mobile station 102 is representative of any electronic device that may be reasonably moved about by a user and may store one or more LRI blocks 114. By way of example but not limitation, mobile station 102 may comprise a computing and/or communication device such as a mobile telephone, a smartphone, a laptop computer, a tablet computer, a wearable computer, a personal digital assistant, a navigation device, etc.

Proxy device 130, which is optional, is representative of any computing device that may be coupled to mobile station 102 and which may exchange (e.g., via communication link 108-6, which may be wireless or non-wireless) one or more LRI blocks 114' for one or more LRI blocks 114 stored at mobile station 102. For example, proxy device 130 may take the form of a personal computer, a server, a cloud computer arrangement, a mobile hotspot (e.g., a MiFi), and/or the like, which may provide an external storage capability to mobile station 102. In certain example implementations, proxy device may further act as a proxy to provide synchronization (e.g., with off-line updating) for mobile station 102 with regard to LRI blocks 112 available from one or more computing devices 106.

Mobile station 102, proxy device 130, and computing devices 106 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or, more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

FIG. 1 also illustrates a plurality of radio transmitters 104, various communication links 108, one or more networks 110, a request 116 (e.g., for LRI), a response 118 (e.g., providing one or more blocks of LRI), a structure 120, and one or more other computing resources 122.

As illustrated, mobile station 102 may transmit a request 116 via at least one communication link 108 to at least one computing device 106. Mobile station 102 may receive a response 118 via at least one communication link 108 from at least one computing device 106. Here, for example, request 116 and/or response 118 may take the form of one or more messages transmitted via wireless communication link 108-1, network(s) 110, and non-wireless communication link 108-2, and/or directly via wireless communication link 108-3. Similarly, for example, proxy device 130 may send a request 116 and/or receive a response 118 via communication link 108-7.

It should be recognized that one or more communication links 108 shown in FIG. 1, may comprise one or more wireless communication links and/or one or more non-wireless communication links (e.g., with signals transmitted using one or more wires, fibers, etc.), and that such communication links 108 and/or network(s) 110 may also represent various supporting devices and/or technologies associated therewith.

In this example, structure 120 is representative of any man-made and/or naturally occurring set of physical features for which LRI may be provided to support signal-based position estimation and/or other like location based services and/or navigation capabilities of mobile station 102. Thus, for example, structure 120 may represent a building or set of buildings, an airport, an arena, a warehouse, a campus, a zoo, etc. In such instances, various location based services may be provided to further enhance a user's experience in navigating about structure 120 using mobile station 102. For example, context information and/or other useful information may be provided to a mobile station 102 as part of a location based service for a given structure. By way of example, a wireless access point located at or near structure 120 (or elsewhere) may transmit information relating to location based services to mobile station 102. In certain example implementations, such information may comprise metadata, all or part of which may take the form of blocks of LRI.

Radio transmitter(s) 104, in this example, are representative of any device that may transmit one or more wireless signals which may be used by mobile station 102 for estimating its position, trajectory, etc. For example, a radio transmitter 104 may comprise a special purpose location beacon device, a network access point device, a base station, a femtocell or picocell device, and/or the like. A location of radio transmitter 104 may be provided to mobile station in advance and/or via one or more transmitted signals.

In a non-limiting example, one or more blocks of LRI may comprise expected signal data which may be associated with expected signal strengths (e.g., heat map information) and/or signal propagation times (e.g., delay map information) which may be considered in measuring a range from mobile station to a radio transmitter. Here, for example, such expected signal data may be based, at least in part, on previously measured signal data and/or estimated (e.g., modeled) signal data.

In another non-limiting example, one or more blocks of LRI may comprise connectivity graph information which may associate selected position points within region of space within structure 120 as being arranged such that a user may navigate there between (e.g., without running into a wall or other obstacle).

In yet another non-limiting example, one or more blocks of LRI may comprise routing graph information which may identify a reduced group of selected position points within region of space within structure 120 as being arranged in some expected route that a user may navigate (e.g., down a hallway, to an elevator bank, to an entryway or an exit, etc.).

In still another non-limiting example, one or more blocks of LRI may comprise probability map information identifying a likelihood that a user may move from an estimated position at or near a position point within region of space within structure 120 to or towards another position point (e.g., based on an estimated trajectory, a default user movement capability, previous user movements, etc.).

Figure 2:
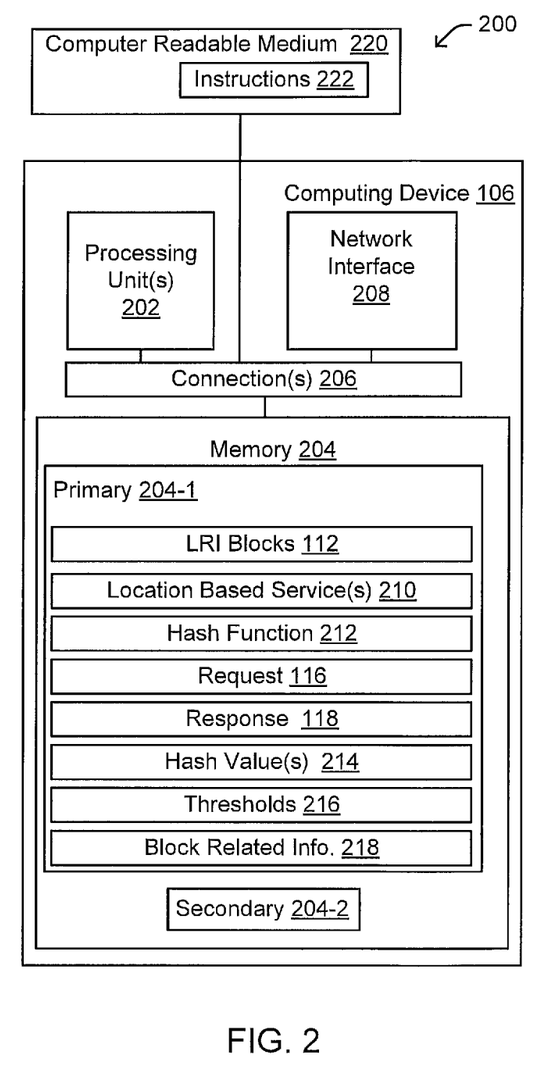
FIG. 2 is a schematic block diagram illustrating certain features of an example computing device capable of providing LRI in blocks to a mobile station, in accordance with an implementation.

Reference is made next to FIG. 2, which is a schematic block diagram illustrating certain features of computing device 106 capable of providing an encoded version of expected signal data to a mobile station.

FIG. 2 shows a specific apparatus 200 in the form of a computing device 106, one or more of which may act, at least in part, to establish LRI blocks 112 for use by one or more mobile stations 102. In certain example implementations, apparatus 200 may act as an individual server, part of a server farm, part of a cloud computing arrangement, etc. In certain example implementations, apparatus 200 may act as part of a network 110, e.g., at a base station, an access point, etc. In certain example implementations, apparatus 200 may comprise and/or be coupled to one or more other resources (devices) 122 that may be arranged to provide LRI and/or other like information, and/or perform other supportive services.

With this mind, as illustrated in FIG. 2, example computing device 106 may comprise one or more processing units 202, memory 204, connections 206, and a network interface 208. As shown, memory 204 may comprise a primary memory 204-1, and/or a secondary memory 204-2. Here, for example, primary memory 204-1 may store instructions for establishing and/or data relating to LRI blocks 112, which may be executed or used by processing unit(s) 202.

As illustrated, at certain times primary memory 204-1 may, for example, store information relating to one or more requests 116 and/or one or more responses 118. For example, a request 116 may be received from mobile station 102 and/or proxy device 130 via network interface 208. For example, a response 118 may be generated by processing unit(s) 202 and transmitted to mobile station 102 and/or proxy device 130 via network interface 208. Network interface 208 may, for example, comprise one or more wireless transmitters/receivers and/or one or more non-wireless interfaces (e.g., Ethernet, etc.).

As illustrated, at certain times primary memory 204-1 may store information and/or instructions relating to one or more location based services 210. Here, for example, a location based service may support a position estimation capability and/or other like navigation capability of mobile station 102 with respect to all or part of structure 120.

As illustrated, at certain times primary memory 204-1 may store information and/or instructions relating to a hash function and/or other like mechanism for establishing a unique identifier for an LRI block 112. For example, a hash function 212 may comprise a SHA-1, an MD5, and/or other like hash functions. Hash function 212 may generate a hash value 214 corresponding to an LRI block 112.

As illustrated, at certain times primary memory 204-1 may, for example, store other block related information 218 associated with one or more LRI blocks 112. For example, other block related information 218 may comprise timestamp or other like "age" information, intended mobile station usage, region or structure related information, LCI related information, transition related feature information, etc.

As illustrated, computing device 106 may take the form of a specific computing device comprising one or more processing units 202 that perform data processing (e.g., in accordance with all or part of the techniques provided herein) coupled to memory 204 via one or more connections 206. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within the computing device. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220. As illustrated, memory 204 and/or computer readable medium 220 may comprise computer-implementable instructions 222 associated with data processing (e.g., in accordance with the techniques provided herein).

Figure 3:
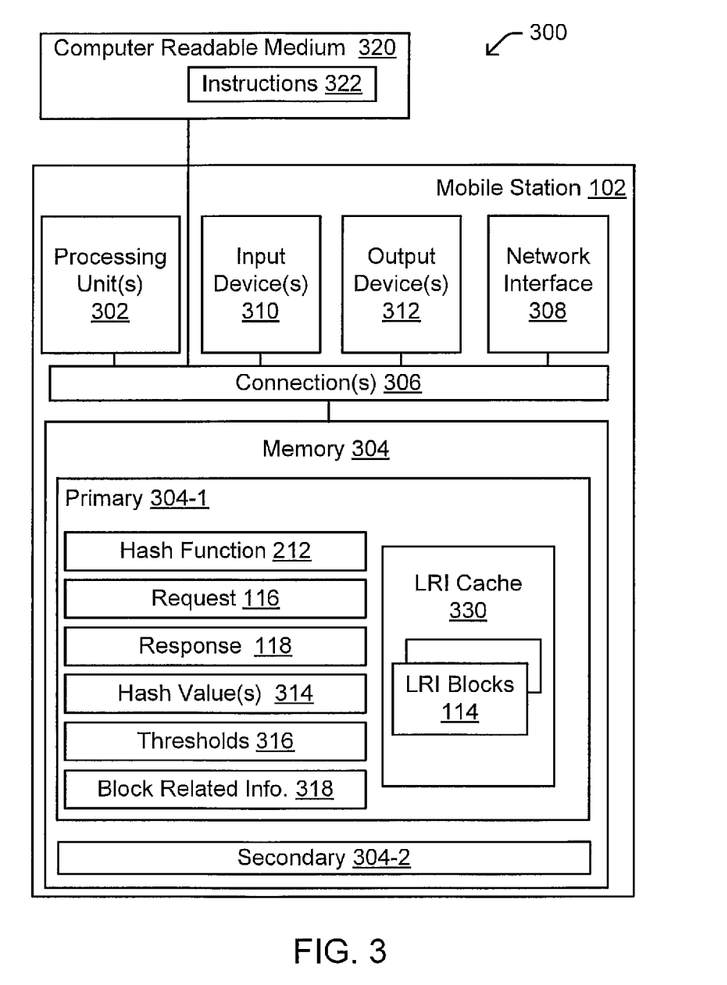
FIG. 3 is a schematic block diagram illustrating certain features of an example mobile station capable of receiving and using LRI in blocks, in accordance with an implementation.

Reference is made next to FIG. 3, which is a schematic block diagram illustrating certain features of mobile station 102, for example as in FIG. 1, capable of obtaining and using LRI blocks 114, which may be stored in an LRI cache 330, for example.

FIG. 3 shows a specific apparatus 300 in the form of a mobile station 102 which may act, at least in part, to generate and transmit a request 116 to and receive and process a response 118 from more computing devices 106 via network interface 308. Mobile station 102 may also exchange LRI blocks with a proxy device 130 via network interface 308. In certain example implementations, apparatus 300 may take the form of any electronic device that may be reasonably moved about by a user.

With this mind, as illustrated in FIG. 3, example mobile station 102 may comprise one or more processing units 302, memory 304, connections 306, a network interface 308, one or more user input devices 310, and one or more user output devices 312. As shown, memory 304 may comprise a primary memory 304-1, and/or a secondary memory 304-2. Here, for example, primary memory 304-1 is illustrated as storing information relating to LRI blocks 114, which may be used by processing unit(s) 302. Primary memory may store instructions for a hash function 212 that may be executed by processing unit(s) 302 to generate hash values 314 for existing LRI blocks 114.

Primary memory may, for example, store instructions and other information relating to or for use in maintaining LRI blocks in LRI cache 330. For example, one or more threshold values 316 may be considered as part of an update and/or eviction process, possibly along with other block related information 318. For example, other block related information 318 may comprise timestamp or other like age information, frequency of use information, region or structure related information, LCI related information, transition related feature information, etc.

As illustrated, mobile station 102 may take the form of a specific computing device comprising one or more processing units 302 to perform data processing (e.g., in accordance with all or part of the techniques provided herein) coupled to memory 304 via one or more connections 306. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile station 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 320. As illustrated, memory 304 and/or computer readable medium 320 may comprise computer-implementable instructions 322 associated with data processing (e.g., in accordance with the techniques provided herein).

In certain example implementations, as illustrated, mobile station 102 may further comprise one or more user input devices 310 (e.g., keyboard, touch screen, etc.) and/or one or more user output devices 312 (e.g., a display, a projector, a speaker, etc.). Hence, for example, location based service information may be presented to the user via some form of user output. Also, user input may be received which relates to location based services or other capabilities.

Although not illustrated, it should be understood that mobile station 102 may be enabled to perform a variety of tasks, some or many of which may be unrelated to location based services and/or other like position estimation capabilities. Thus, mobile station 102 may comprise a GPS or other like global navigation satellite system (GNSS) or satellite positioning system (SPS) receiver (not shown) that may be used to establish an estimated initial position, for example.

Thus, for example, an SPS may comprise a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of GNSS such as GPS, Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 4:
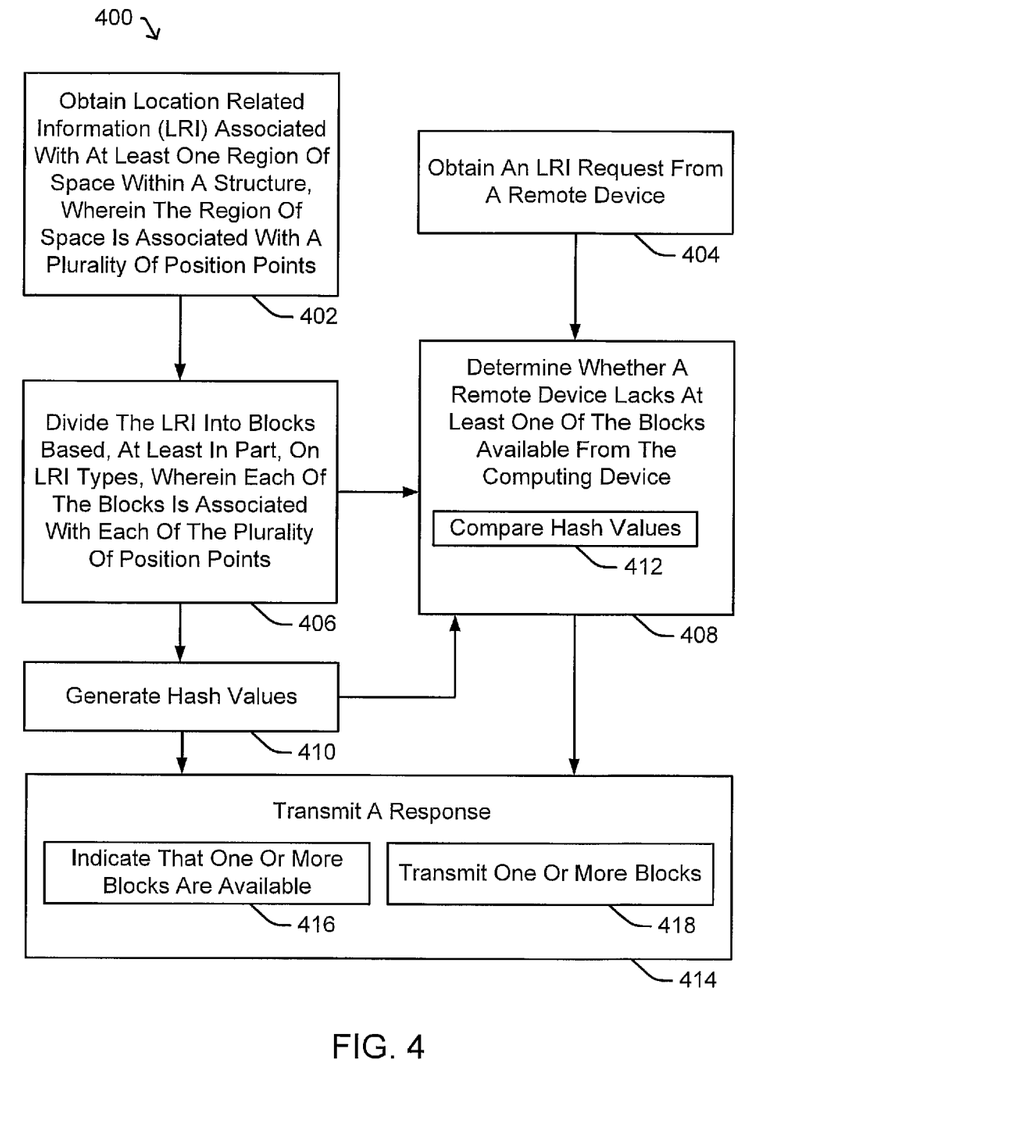
FIG. 4 is a flow diagram illustrating certain features of an example process for selectively providing LRI in blocks, in accordance with an implementation.

FIG. 4 is a flow diagram illustrating certain features of an exemplary process 400 that may be implemented to establish LRI blocks 112, for example, in one or more computing devices 106 (FIG. 1).

At block 402, LRI may be obtained. Here, for example, the LRI may be associated with at least one region of space within a structure, wherein the region of space is associated with a plurality of position points. For example, the region of space may relate to a section within a structure, a tiled portion of a map, an LCI, etc.

At block 404, an LRI request may be received from a remote device. Here, for example, an LRI request may be associated with a mobile station and/or a proxy device associated with the mobile station. In certain instances, an example LRI request may comprise one or more indications relating to existing LRI blocks 114/114' available at a remote device. For example, an indication may comprise a unique identifier in form of a hash value derived using an existing LRI block.

At block 406, independent of or in response to an LRI request, at least a portion of the LRI may be divided and/or otherwise arranged into blocks based, at least in part, on one or more identifiable LRI types. Here, for example, each of the resulting LRI blocks may be associated with each of the plurality of position points in a region of space.

At block 408, a determination may be made as to whether a remote device lacks at least one of the blocks available from the computing device. For example, at block 412, a received hash value associated with an existing LRI block at a remote device may be compared to a hash value associated with an available LRI block at the computing device. For example, at block 410, a hash value may be generated an available LRI block at the computing device.

At block 408, a determination may be made as to whether a remote device lacks at least one of the blocks available from the computing device based on an explicit request in an LRI request. For example, a remote device may decide to request one or more LRI blocks in an LRI request. Here, such an LRI request may be based, at least in part, on a previously transmitted response at block 414, and in particular, at block 416 wherein the one or more computing device(s) may indicate in some manner that one or more blocks are available. As such, one or more hash values from block 410 may be provided to a remote device for comparison to hash values for existing blocks at the remote device. Hence, a subsequent LRI request at block 404 may explicitly identify one or more blocks available from the one or more computing devices which are desired by the remote device.

At block 416, a response may be transmitted, which at block 418 comprises one or more blocks (e.g., as identified at block 408) available for at the computing device(s) determined to not exist yet at a remote device.

Figure 5:
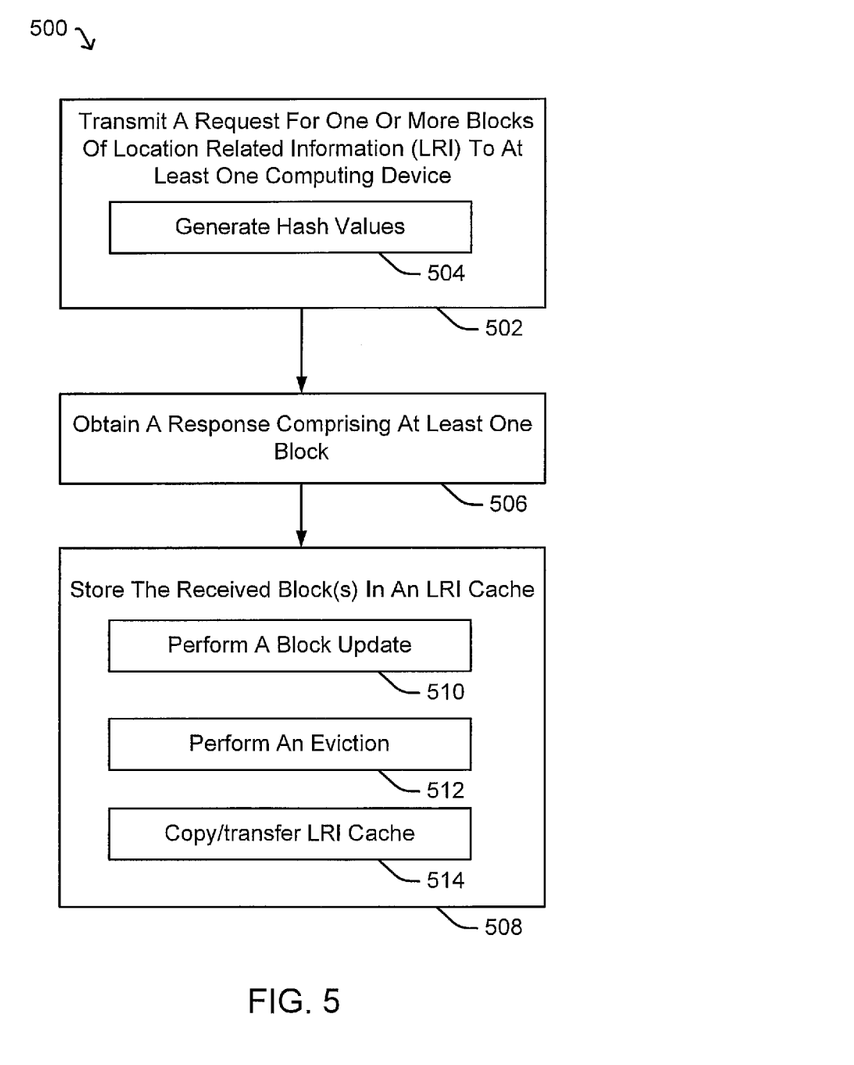
FIG. 5 is a flow diagram illustrating certain features of an exemplary process for selectively receiving and storing LRI in blocks, in accordance with an implementation.

FIG. 5 is a flow diagram illustrating certain features of an exemplary process 500 that may be implemented to obtain and/or maintain LRI blocks 114 in a remote device, such as, a mobile station 102 and/or associated proxy device 130 (FIG. 1).

At block 502, an LRI request for one or more blocks of LRI may be transmitted to at least one computing device. Here, for example, an LRI request may comprise an indication of existing blocks of LRI available from the remote device. For example, an indication may comprise a unique identifier, such as, a hash value as generated at block 504 for an existing block. In another example implementation, an LRI request may request information about blocks of LRI that are available from one or more computing device(s). In certain instances, an LRI request may identify an estimated initial position of a mobile station and/or information relating to one or more regions of space.

At block 506, a response comprising at least one block of LRI may be received from one or more computing device(s). At block 508, one or more received block(s) of LRI may be stored in memory, for example, in an LRI cache. At block 510, for example, a block update may be performed to replace an existing block with a received block. At block 512, for example, one or more existing blocks may be evicted from an LRI cache. Here, for example, one or more existing blocks or portions thereof may be removed to make room for a received block in an LRI cache. Here, for example, one or more existing blocks or portions thereof may be removed for various other reasons, such as, age, lack of use, size, etc.

In certain example implementations, at block 514, all or part of the information stored in an LRI cache in a remote device may be copied and/or otherwise transferred either to or from another remote device. Here, for example, an LRI block may be copied or otherwise transferred from a mobile station to a proxy device, or conversely an LRI block may be copied or otherwise transferred from a proxy device to a mobile station.

Figure 6A:
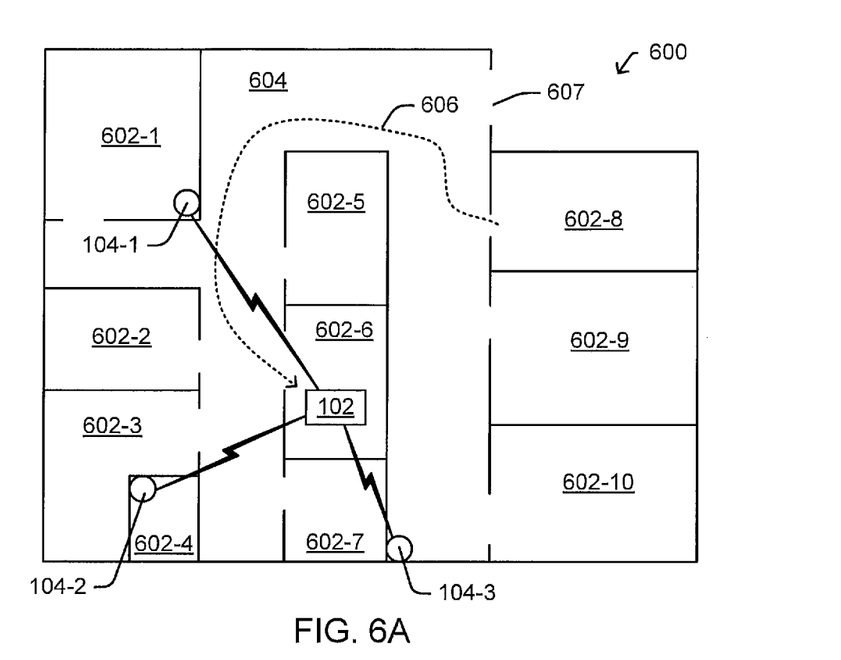
FIG. 6A is floor plan diagram illustrating certain features of a portion of an example structure for which LRI may be selectively provided in blocks for use in estimating position and/or supporting other like navigation capabilities, in accordance with an implementation.

Attention is drawn next to FIG. 6A, which is floor plan diagram illustrating certain features of a portion of an exemplary structure, e.g., a floor 600 of a building, for which one or more blocks of LRI may be provided to a mobile station 102 and/or proxy device 130.

As shown, example floor 600 comprises a plurality of rooms 602 connected via a hallway 604. Radio transmitters 104-1, 104-2 and 104-3 are shown in room 602-1, room 602-4 and hallway 604, respectively. Mobile station 102 is illustrated has being positioned in room 602-6. A navigation route 606 is illustrated extending from room 602-8 through hallway 604 to room 602-6. Navigation route 606 illustrates an example movement/trajectory of mobile station 102. In its current position in room 602-6, mobile station is illustrated as being capable of receiving transmitted signals from radio transmitters 104-1, 104-2 and 104-3.

Figure 6B:
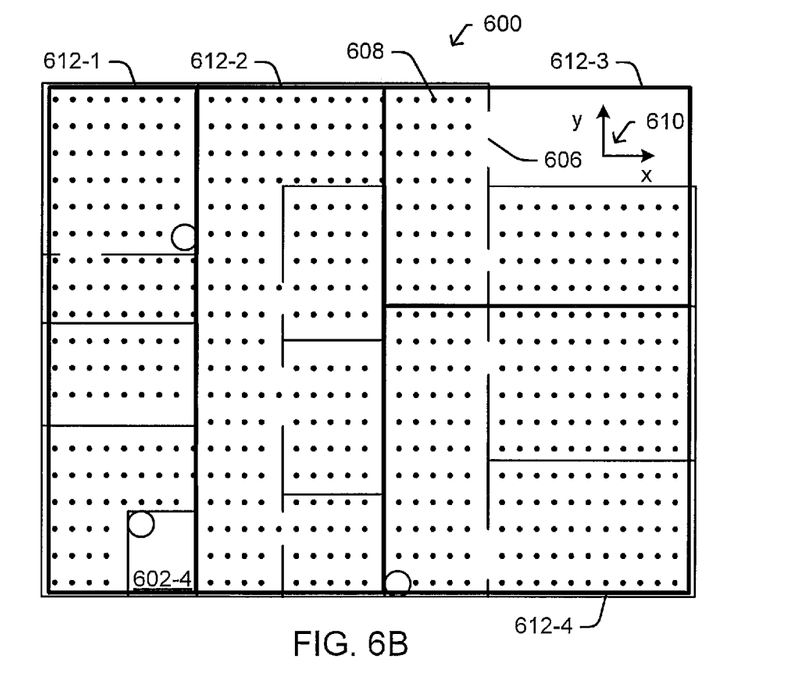
FIG. 6B is floor plan diagram similar to FIG. 6A, further illustrating an example layout of position points and example tile potions of a map that may be associated with selected LRI blocks, in accordance with an implementation.

Reference is made next to FIG. 6B, wherein a plurality of position points 608 are shown overlaying example floor plan 600. Here, for example, position points 608 are arranged in a grid pattern having rows parallel to an x-axis and columns parallel to a y-axis (e.g., see directional arrows 610). Notice that in this example some position points are not shown as they fall on the lines representing walls. Also, note that in this example, position points are not shown in room 602-4, which in this example, is deemed inaccessible for the mobile station's user (e.g., this room may be an equipment space, etc.). Hence, in certain instances LRI may not be applicable for some position points.

Additionally, a plurality of tile portions 612 are illustrated in FIG. 6B as overlaying example floor plan 600 and comprising specific subsets of position points 608. For example, tile portion 612-1 overlaps rooms 602-1 through 602-4 and part of hallway 604, tile portion 612-2 overlaps rooms 602-5 through 602-7 and part of hallway 604, and tile portion 612-4 overlaps rooms 602-9 and 602-10 and part of hallway 604. Tile portion 612-3, for example, overlaps room 602-8, part of hallway 604, and also an example transition related feature 607 (e.g., an entryway/exit). It should be understood that these example tile portions are intended only to illustrate that a structure or related map may be subdivided into various regions of space. In certain instances, such tile portions and/or other like regions of space may be identified by and/or as relating in some manner to certain LCIs.

In certain example implementations, one or more blocks of LRI may be established for a radio transmitter for each region of space however specified. Here, for example, each block of LRI may provide applicable data for each position point associated with the region of space.

Figure 7:
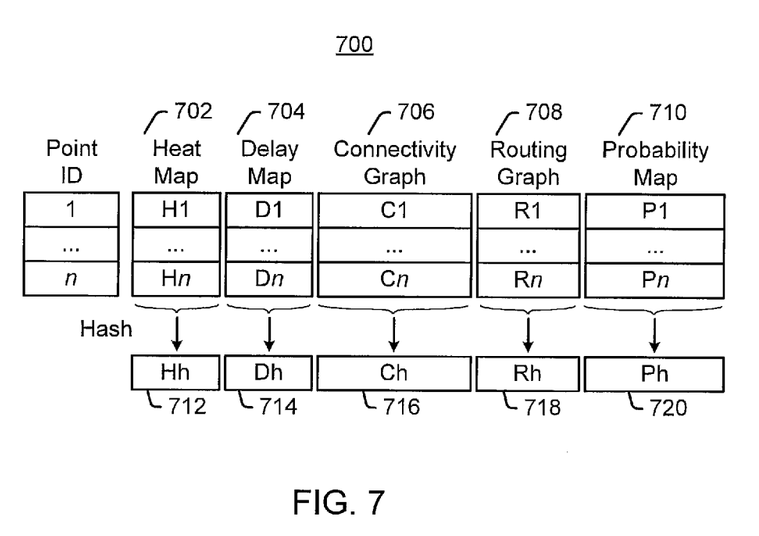
FIG. 7 is an illustrative diagram showing several example LRI blocks, in accordance with an implementation.

With this in mind, attention is drawn to FIG. 7, which is an illustrative diagram showing a group 700 of several representative LRI blocks associated with a radio transmitter for a region of space having position points therein with point IDs from 1 through n. Example LRI block 702 comprises corresponding heat map information having data H1 through Hn for point IDs from 1 through n. Example LRI block 704 comprises corresponding delay map information having data D1 through Dn for point IDs from 1 through n. Example LRI block 706 comprises corresponding connectivity graph information having data C1 through Cn for point IDs from 1 through n. In a particular but non-limiting example, C1 to Cn may comprise a one byte bit-field relating connectivity from a point ID to its neighboring point IDs, e.g., in a known direction either clockwise or counter clockwise. Example LRI block 708 comprises corresponding routing graph information having data R1 through Rn for point IDs from 1 through n. Example LRI block 710 comprises corresponding heat map information having data P1 through Pn for point IDs from 1 through n. It should be understood that the preceding examples are not the only way in which metadata may be represented and further that claimed subject matter is not intended to be limited in this manner.

As further illustrated, in accordance with certain example implementations, a hash function may be employed to generate a unique identifier for an LRI block. As shown, for example, a hash value 712 (Hh) may be generated based on the data of LRI block 702, a hash value 714 (Dh) may be generated based on the data of LRI block 704, a hash value 716 (Ch) may be generated based on the data of LRI block 706, a hash value 718 (Rh) may be generated based on the data of LRI block 708, and/or a hash value 720 (Ph) may be generated based on the data of LRI block 710.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For an implementation involving firmware and/or hardware using software, all or part of the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of non-transitory media upon which memory is stored.

If implemented in firmware and/or hardware using software, all or part of the functions may be stored as one or more instructions or code on a non-transitory computer-readable medium. Examples include computer-readable media encoded with a data structure and computer-readable media encoded with a computer program. Computer-readable media includes non-transitory physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   with at least one computing device:
   obtaining one or more signals representing location related information (LRI) for at least one region of space within a structure, wherein said at least one region of space corresponds to a plurality of position points;
   dividing said LRI into at least two blocks based, at least in part, on two or more different LRI types, wherein each of said at least two blocks corresponds to said at least one region; and
   in response to a determination that a remote device lacks at least one of said at least two blocks available from said at least one computing device, transmitting said at least one of said at least two blocks to said remote device.

2. The method as recited in claim 1, further comprising:
   with said at least one computing device, obtaining an LRI request from said remote device.

3. The method as recited in claim 2, wherein said LRI request comprises an indication of one or more existing blocks at said remote device.

4. The method as recited in claim 3, further comprising:
   with said at least one computing device, determining that said remote device lacks said at least one of said at least two blocks available from said at least one computing device based, at least in part on said indication.

5. The method as recited in claim 3, further comprising:
   with said at least one computing device, in response to said LRI request, transmitting a response to said remote device, said response comprising an indication that at least one of said at least two blocks is available from said at least one computing device.

6. The method as recited in claim 2, wherein said LRI request indicates said determination that said remote device lacks said at least one of said at least two blocks available from said at least one computing device.

7. The method as recited in claim 1, wherein said plurality of position points is arranged in an identifiable pattern.

8. The method as recited in claim 1, wherein said at least one region of space corresponds to at least one of: a tiled portion of a map for said structure, or a location context identifier (LCI).

9. The method as recited in claim 1, wherein said LRI comprises metadata.

10. The method as recited in claim 1, wherein said LRI corresponds to a location based service associated with said structure.

11. The method as recited in claim 1, wherein said LRI corresponds to a specific radio transmitter.

12. The method as recited in claim 1, wherein at least a portion of said LRI is operatively associated with at least one of: said remote device, a class of remote devices, a user account associated with said remote device, or a class of user accounts.

13. The method as recited in claim 1, wherein said LRI in a first block of said at least two blocks comprises one of: expected signal data information, connectivity graph information, routing graph information, or probability map information.

14. The method as recited in claim 13, wherein said expected signal data information is associated with at least one of: a signal strength, or a signal propagation time.

15. The method as recited in claim 1, wherein said remote device comprises at least one of: a mobile station, or a proxy device associated with said mobile station.

16. The method as recited in claim 1, further comprising:
   with said at least one computing device:
   in response to a determination that said at least one region of space comprises at least one transition feature associated with said structure, selectively predetermining at least one of said at least two blocks.

17. The method as recited in claim 1, wherein transmitting said at least one of said at least two blocks to said remote device further comprises selectively transmitting a preexisting version of at least one of said at least two blocks.

18. The method as recited in claim 1, wherein obtaining said LRI comprises selectively predetermining at least one of said at least two blocks.

19. A method comprising:
   with at least one computing device:
   obtaining one or more signals representing location related information (LRI) for at least one region of space within a structure, wherein said at least one region of space corresponds to a plurality of position points;
   dividing said LRI into at least two blocks based, at least in part, on two or more LRI types, wherein each of said blocks is associated with each of said plurality of position points;
   obtaining an LRI request from a remote device, said LRI request comprising an indication of one or more existing blocks at said remote device comprising at least a first hash value for a first existing block available at said remote device;
   determining that said remote device lacks said at least one of said at least two blocks available from said at least one computing device based, at least in part on a comparison of, said first hash value to a second hash value associated with a corresponding first block available from said at least one computing device; and
   in response to a determination that said remote device lacks said at least one of said at least two blocks available from said at least one computing device, transmitting said at least one of said at least two blocks to said remote device.

20. A method comprising:
   with at least one computing device:
   obtaining one or more signals representing location related information (LRI) for at least one region of space within a structure, wherein said at least one region of space corresponds to a plurality of position points;
   dividing said LRI into at least two blocks based, at least in part, on two or more LRI types, wherein each of said blocks is associated with each of said plurality of position points;
   obtaining an LRI request from a remote device, said LRI request comprising a hash value for one or more existing blocks at said remote device;
   transmitting a response to said remote device, said response comprising a hash value for a corresponding one of said at least two blocks available from said at least one computing device; and in response to a determination that said remote device lacks at least one of said at least two blocks available from said at least one computing device, transmitting said at least one of said at least two blocks to said remote device.

21. An apparatus comprising:
a network interface; and
one or more processing units to:
  obtain location related information (LRI) for at least one region of space within a structure, wherein said at least one region of space corresponds to a plurality of position points;
  divide said LRI into at least two blocks based, at least in part, on two or more different LRI types, wherein each of said at least two blocks corresponds to said at least one region; and
  in response to a determination that a remote device lacks at least one of said at least two blocks available from said apparatus, initiate transmission of said at least one of said at least two blocks to said remote device via said network interface.

22. The apparatus as recited in claim 21, said one or more processing units to further obtain an LRI request from said remote device via said network interface.

23. The apparatus as recited in claim 22, wherein said LRI request comprises an indication of one or more existing blocks at said remote device, and said one or more processing units to further determine that said remote device lacks said at least one of said at least two blocks available from said apparatus based, at least in part on said indication.

24. The apparatus as recited in claim 23, said one or more processing units to further, in response to said LRI request, initiate transmission of a response to said remote device via said network interface, said response comprising an indication that at least one of said at least two blocks is available from said apparatus.

25. The apparatus as recited in claim 24, wherein said indication comprises a hash value for a corresponding one of said at least two blocks available from said apparatus.

26. The apparatus as recited in claim 22, wherein said LRI request indicates said determination that said remote device lacks said at least one of said at least two blocks available from said apparatus.

27. The apparatus as recited in claim 21, wherein said at least one region of space corresponds to at least one of: a tiled portion of a map of said structure, or a location context identifier (LCI).

28. The apparatus as recited in claim 21, wherein said LRI in a first block of said at least two blocks comprises one of:-expected signal data information, connectivity graph information, routing graph information, or probability map information.

29. The apparatus as recited in claim 21, wherein said remote device comprises at least one of: a mobile station, or a proxy device associated with said mobile station.

30. An apparatus comprising:
a network interface; and
one or more processing units to:
  obtain location related information (LRI) for at least one region of space within a structure, wherein said at least one region of space corresponds to a plurality of position point;
  divide said LRI into at least two blocks based, at least in part, on two or more LRI types, wherein each of said blocks is associated with each of said plurality of position points;
  obtain an LRI request from said remote device via said network interface, said LRI request comprising an indication of one or more existing blocks at said remote device, wherein said indication comprises at least a first hash value for a first existing block available at said remote device;
  determine that said remote device lacks said at least one of said at least two blocks available from said apparatus based, at least in part on a comparison of said first hash value to a second hash value associated with a corresponding first block available from said at least one computing device; and
  in response to a determination that a remote device lacks at least one of said at least two blocks available from said apparatus, initiate transmission of said at least one of said at least two blocks to said remote device via said network interface.

31. An apparatus comprising:
means for obtaining location related information (LRI) for at least one region of space within a structure, wherein said at least one region of space corresponds to a plurality of position points;
means for dividing said LRI into at least two blocks based, at least in part, on two or more different LRI types, wherein each of said at least two blocks corresponds to said at least one region; and
means for transmitting at least one of said at least two blocks to a remote device, in response to a determination that said remote device lacks said at least one of said at least two blocks available from said apparatus.

32. The apparatus as recited in claim 31, further comprising:
means for obtaining an LRI request from said remote device.

33. The apparatus as recited in claim 32, wherein said LRI request comprises an indication of one or more existing blocks at said remote device, and further comprising:
means for determining that said remote device lacks said at least one of said at least two blocks available from said apparatus based, at least in part on said indication.

34. The apparatus as recited in claim 33, further comprising:
means for transmitting a response to said remote device in response to said LRI request, said response comprising an indication that at least one of said at least two blocks is available from said apparatus.

35. The apparatus as recited in claim 34, wherein said indication comprises a hash value for a corresponding one of said at least two blocks available from said apparatus.

36. The apparatus as recited in claim 32, wherein said LRI request indicates said determination that said remote device lacks said at least one of said at least two blocks available from said apparatus.

37. The apparatus as recited in claim 31, wherein said at least one region of space corresponds to at least one of: a tiled portion of a map of said structure, or a location context identifier (LCI).

38. The apparatus as recited in claim 31, wherein said LRI in a first block of said at least two blocks comprises one of: expected signal data information, connectivity graph information, routing graph information, or probability map information.

39. The apparatus as recited in claim 31, wherein said remote device comprises at least one of: a mobile station, or a proxy device associated with said mobile station.

40. An apparatus comprising:
means for obtaining location related information (LRI) for at least one region of space within a structure, wherein said at least one region of space corresponds to a plurality of position points;
means for dividing said LRI into at least two blocks based, at least in part, on two or more LRI types, wherein each of said blocks is associated with each of said plurality of position points;
means for obtaining an LRI request from said remote device, said LRI request comprising an indication of one or more existing blocks at said remote device, wherein said indication comprises at least a first hash value for a first existing block available at said remote device;
means for determining that said remote device lacks said at least one of said at least two blocks available from said apparatus based, at least in part on a comparison of said first hash value to a second hash value a corresponding first block available from said apparatus; and
means for transmitting at least one of said at least two blocks to a remote device, in response to a determination that said remote device lacks said at least one of said at least two blocks available from said apparatus.

41. An article comprising:
a non-transitory computer readable medium having stored therein computer-implementable instructions executable by one or more processing units in at least one computing device to:
obtain location related information (LRI) for at least one region of space within a structure, wherein said at least one region of space corresponds to a plurality of position points;
divide said LRI into at least two blocks based, at least in part, on two or more different LRI types, wherein each of said blocks corresponds to said at least one region; and
in response to a determination that a remote device lacks at least one of said at least two blocks available from said at least one computing device, initiate transmission of said at least one of said at least two blocks to said remote device.

42. The article as recited in claim 41, said computer-implementable instructions being further executable by said one or more processing units to obtain an LRI request from said remote device.

43. The article as recited in claim 42, wherein said LRI request comprises an indication of one or more existing blocks at said remote device, and said computer-implementable instructions are further executable by said one or more processing units to determine that said remote device lacks said at least one of said at least two blocks available from said at least one computing device based, at least in part on said indication.

44. The article as recited in claim 43, said computer-implementable instructions being further executable by said one or more processing units to, in response to said LRI request, initiate transmission of a response to said remote device, said response comprising an indication that at least one of said at least two blocks is available from said at least one computing device.

45. The article as recited in claim 44, wherein said indication comprises a hash value for a corresponding one of said at least two blocks available from said at least one computing device.

46. The article as recited in claim 42, wherein said LRI request indicates said determination that said remote device lacks said at least one of said at least two blocks available from said at least one computing device.

47. The article as recited in claim 41, wherein said at least one region of space corresponds to at least one of: a tiled portion of a map of said structure, or a location context identifier (LCI).

48. The article as recited in claim 41, wherein said LRI in a first block of said at least two blocks comprises one of: expected signal data information, connectivity graph information, routing graph information, or probability map information.

49. The article as recited in claim 41, wherein said remote device comprises at least one of: a mobile station, or a proxy device associated with said mobile station.

50. An article comprising:
a non-transitory computer readable medium having stored therein computer-implementable instructions executable by one or more processing units in at least one computing device to:
obtain location related information (LRI) for at least one region of space within a structure, wherein said at least one region of space corresponds to a plurality of position points;
divide said LRI into at least two blocks based, at least in part, on two or more LRI types, wherein each of said blocks is associated with each of said plurality of position points;
obtain an LRI request from said remote device, said LRI request comprising an indication of one or more existing blocks at said remote device, wherein said indication comprises at least a first hash value for a first existing block available at said remote device;
determine that said remote device lacks said at least one of said at least two blocks available from said apparatus based, at least in part on a comparison of said first hash value to a second hash value associated with a corresponding first block available from said apparatus; and
in response to a determination that a remote device lacks at least one of said at least two blocks available from said at least one computing device, initiate transmission of said at least one of said at least two blocks to said remote device.

51. An apparatus comprising:
a network interface; and
one or more processing units to:
obtain location related information (LRI) for at least one region of space within a structure, wherein said at least one region of space corresponds to a plurality of position points;
divide said LRI into at least two blocks based, at least in part, on two or more LRI types, wherein each of said blocks is associated with each of said plurality of position points;
obtain an LRI request from a remote device via said network interface, said LRI request comprising at least a first hash value for a first existing block available at said remote device;
determine that said remote device lacks said at least one of said at least two blocks available from said at least one computing device based, at least in part on a comparison of said first hash value to a second hash value associated with a corresponding first block available from said at least one computing device; and
initiate transmission of said at least one of said at least two blocks to said remote device via said network interface, in response to a determination that said remote device lacks said at least one of said at least two blocks available from said at least one computing device.

52. An apparatus comprising:
- means for obtaining location related information (LRI) for at least one region of space within a structure, wherein said at least one region of space corresponds to a plurality of position points;
- means for dividing said LRI into at least two blocks based, at least in part, on two or more LRI types, wherein each of said blocks is associated with each of said plurality of position points;
- means for obtaining an LRI request from a remote device, said LRI request comprising at least a first hash value for a first existing block available at said remote device;
- means for determining that said remote device lacks said at least one of said at least two blocks available from said at least one computing device based, at least in part on a comparison of said first hash value to a second hash value associated with a corresponding first block available from said at least one computing device; and
- means for initiate transmission of said at least one of said at least two blocks to said remote device, in response to a determination that said remote device lacks said at least one of said at least two blocks available from said at least one computing device.

53. An article comprising:
- a non-transitory computer readable medium having stored therein computer-implementable instructions executable by one or more processing units in at least one computing device to:
  - obtain location related information (LRI) for at least one region of space within a structure, wherein said at least one region of space corresponds to a plurality of position points;
  - divide said LRI into at least two blocks based, at least in part, on two or more LRI types, wherein each of said blocks is associated with each of said plurality of position points;
  - obtain an LRI request from a remote device, said LRI request comprising at least a first hash value for a first existing block available at said remote device;
  - determine that said remote device lacks said at least one of said at least two blocks available from said at least one computing device based, at least in part on a comparison of said first hash value to a second hash value associated with a corresponding first block available from said at least one computing device; and
  - in response to a determination that said remote device lacks said at least one of said at least two blocks available from said at least one computing device, initiate transmission of said at least one of said at least two blocks to said remote device.

* * * * *